United States Patent
Shirode

(10) Patent No.: US 12,441,824 B2
(45) Date of Patent: Oct. 14, 2025

(54) RUBBER COMPOSITION AND TIRE

(71) Applicant: Toyo Tire Corporation, Itami (JP)

(72) Inventor: Kensuke Shirode, Itami (JP)

(73) Assignee: Toyo Tire Corporation, Itami (JP)

( * ) Notice: Subject to any disclaimer, the term of this patent is extended or adjusted under 35 U.S.C. 154(b) by 547 days.

(21) Appl. No.: 17/983,636

(22) Filed: Nov. 9, 2022

(65) Prior Publication Data

US 2023/0203226 A1 Jun. 29, 2023

(30) Foreign Application Priority Data

Dec. 27, 2021 (JP) ................................. 2021-213130

(51) Int. Cl.
| | |
|---|---|
| *C08K 5/5455* | (2006.01) |
| *B60C 1/00* | (2006.01) |
| *C08F 212/08* | (2006.01) |
| *C08F 236/06* | (2006.01) |
| *C08K 3/36* | (2006.01) |
| *C08K 5/5419* | (2006.01) |
| *C08K 5/544* | (2006.01) |

(52) U.S. Cl.
CPC .......... *C08F 236/06* (2013.01); *B60C 1/0016* (2013.01); *C08F 212/08* (2013.01); *C08K 3/36* (2013.01); *C08K 5/5419* (2013.01); *C08K 5/544* (2013.01); *C08K 2201/006* (2013.01); *C08K 2201/014* (2013.01)

(58) Field of Classification Search
CPC ........ C08K 5/5455; C08K 5/5419; B60C 1/00
USPC ......................................................... 524/847
See application file for complete search history.

(56) References Cited

U.S. PATENT DOCUMENTS

| 9,309,387 B2 * | 4/2016 | Kushida ................. C08K 5/548 |
| 2013/0172443 A1 * | 7/2013 | Kushida ................... C08K 3/36 |
| | | 523/156 |

FOREIGN PATENT DOCUMENTS

| JP | 3908368 B2 | 4/2007 |
| JP | 6385655 B2 | 9/2018 |
| JP | 6578200 B2 | 9/2019 |

OTHER PUBLICATIONS

G. Beaucage, "Approximations Leading to a Unified Exponential/Power-Law Approach to Small-Angle Scattering", Journal of Applied Crystallography, 1995, vol. 28, pp. 717-728. (12 pages).

* cited by examiner

*Primary Examiner* — Deve V Hall
(74) *Attorney, Agent, or Firm* — WHDA, LLP

(57) ABSTRACT

A rubber composition according to an embodiment contains a diene rubber and silica. A change rate of a distance between aggregates represented by V50/V0 calculated by an inertia radius V50 of a silica aggregate and an inertia radius V0 of the silica aggregate is 1.30 or more. The inertia radius V50 is obtained by performing a small-angle X-ray scattering measurement in a state where a vulcanized rubber obtained by vulcanizing the rubber composition is elongated by 50%, and the inertia radius V0 is obtained by performing a small-angle X-ray scattering measurement in a state where the vulcanized rubber is not elongated.

18 Claims, 1 Drawing Sheet

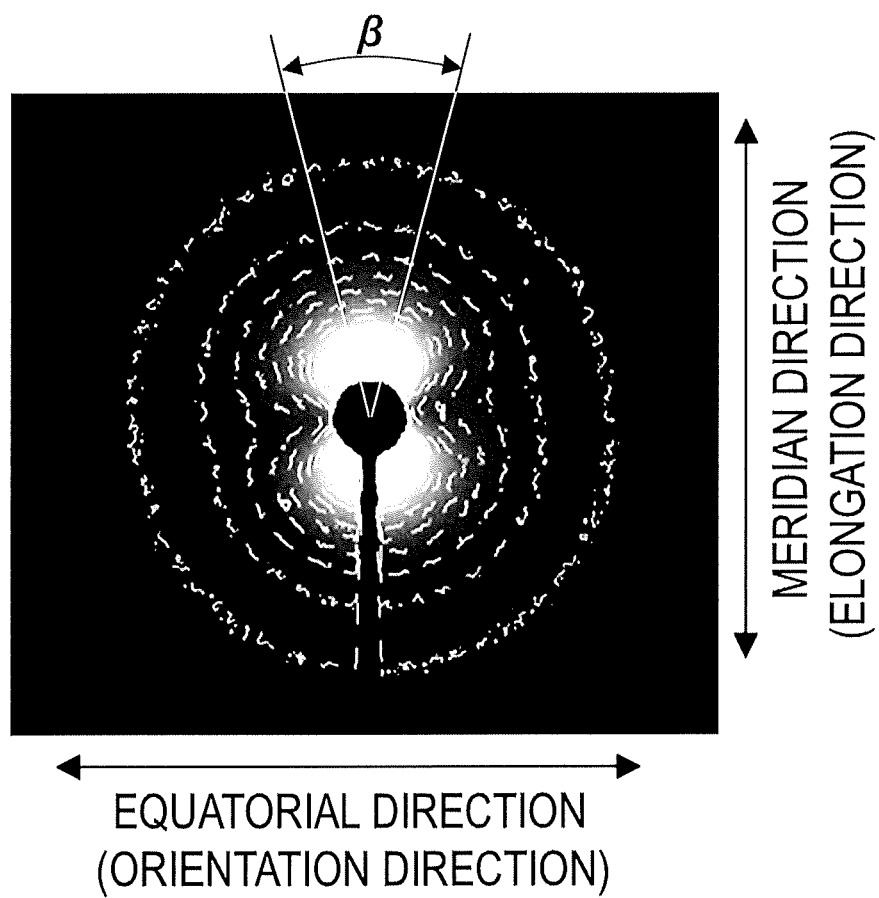

RUBBER COMPOSITION AND TIRE

CROSS-REFERENCE TO RELATED APPLICATION

This application is based upon and claims the benefit of priority from the prior Japanese Patent Application No. 2021-213130, filed on Dec. 27, 2021; the entire contents of which are incorporated herein by reference.

BACKGROUND OF THE INVENTION

1. Field of the Invention

The present invention relates to a rubber composition and a tire using the rubber composition.

2. Description of the Related Art

A tire is required to achieve both wet grip performance, which is grip performance on a wet road surface, and rolling resistance performance, which contributes to a low fuel cost. Therefore, for example, Japanese Patent No. 3908368 discloses that a silane coupling agent having polyethylene glycol in a main chain skeleton is blended in a silica-containing rubber composition in order to improve low electric resistance, low rolling resistance performance, wet grip performance, mechanical strength, and processability.

Japanese Patent No. 4930661 discloses that an alkyltriethoxysilane together with a silane coupling agent having a mercapto group is blended in a silica-containing rubber composition in order to produce a tire excellent in wet performance and rolling resistance.

Japanese Patent No. 6385655 discloses that two types of rubber mixtures containing different silane coupling agents are prepared and mixed to produce a rubber composition in order to improve processability and low heat generation performance.

As described above, various proposals have been made to improve the wet grip performance and the rolling resistance performance. However, the wet grip performance and the rolling resistance performance are conflicting performance, that is, when one is improved, the other is lowered, and it is difficult to achieve both the wet grip performance and the rolling resistance performance.

SUMMARY OF THE INVENTION

An object of the invention is to provide a rubber composition capable of improving conflicting performance regarding wet grip performance and rolling resistance performance, and a tire using the rubber composition.

A rubber composition according to an embodiment of the invention contains a diene rubber and silica, in which a change rate of a distance between aggregates represented by V50/V0 calculated by an inertia radius V50 of a silica aggregate and an inertia radius V0 of the silica aggregate is 1.30 or more, the inertia radius V50 being obtained by performing a small-angle X-ray scattering measurement in a state where a vulcanized rubber obtained by vulcanizing the rubber composition is elongated by 50%, and the inertia radius V0 being obtained by performing a small-angle X-ray scattering measurement in a state where the vulcanized rubber is not elongated.

A vulcanized rubber according to an embodiment of the invention is obtained by vulcanizing a rubber composition containing a diene rubber and silica, in which a change rate of a distance between aggregates represented by V50/V0 calculated by an inertia radius V50 of a silica aggregate and an inertia radius V0 of the silica aggregate is 1.30 or more, the inertia radius V50 being obtained by performing a small-angle X-ray scattering measurement in a state where the vulcanized rubber is elongated by 50%, and the inertia radius V0 being obtained by performing a small-angle X-ray scattering measurement in a state where the vulcanized rubber is not elongated.

The rubber composition may further contain a nitrogen-containing alkoxysilane and an alkylalkoxysilane. A content of the silica may be 5 parts by mass to 150 parts by mass with respect to 100 parts by mass of the diene rubber. A total content of the nitrogen-containing alkoxysilane and the alkylalkoxysilane may be 3 mass % to 15 mass % with respect to the content of the silica. A content ratio of the nitrogen-containing alkoxysilane in the total content of the nitrogen-containing alkoxysilane and the alkylalkoxysilane may be 10 mol % to 80 mol %. The nitrogen-containing alkoxysilane may have at least one functional group selected from the group consisting of an amino group, a ureido group, an isocyanate group, a cyano group, an azide group, and an amide group. The silica may have an orientation in a state where the vulcanized rubber is not elongated. In this case, the inertia radius V50 is a value obtained by performing the small-angle X-ray scattering measurement in a state where the vulcanized rubber is elongated by 50% in a direction perpendicular to an orientation direction of the silica.

A tire according to an embodiment of the invention is produced using the above rubber composition.

According to the embodiment of the invention, conflicting performance regarding wet grip performance and rolling resistance performance can be improved.

BRIEF DESCRIPTION OF THE DRAWINGS

FIG. 1 is a diagram showing an example of a two-dimensional scattering image in a small-angle X-ray scattering measurement.

DESCRIPTION OF EMBODIMENTS

A rubber composition according to the present embodiment contains a diene rubber as a rubber component and silica.

The diene rubber refers to a rubber having a repeating unit corresponding to a diene monomer having a conjugated double bond, and has a double bond in a polymer main chain. Specific examples of the diene rubber include various diene rubbers commonly used in the rubber composition, such as a natural rubber (NR), an isoprene rubber (IR), a butadiene rubber (BR), a styrene-butadiene rubber (SBR), a nitrile rubber (NBR), chloroprene rubber (CR), a styrene-isoprene copolymer rubber, a butadiene-isoprene copolymer rubber, and a styrene-isoprene-butadiene copolymer rubber. These rubbers may be used alone or in combination of two or more kinds thereof. Those obtained by modifying a terminal or a main chain as necessary (for example, a terminal-modified SBR) or those obtained by modification to impart desired characteristics (for example, a modified NR) are also included in the concepts of the diene rubber.

In one embodiment, the diene rubber preferably contains at least one selected from the group consisting of a natural rubber, a styrene-butadiene rubber, and a butadiene rubber. The diene rubber more preferably contains a styrene-butadiene rubber. For example, the diene rubber contains, in 100 parts by mass thereof, the styrene-butadiene rubber in an amount of preferably 50 parts by mass or more, and more preferably 70 parts by mass or more, and may contain only the styrene-butadiene rubber.

The styrene-butadiene rubber may be, for example, a solution-polymerized styrene-butadiene rubber (SSBR) or an emulsion-polymerized styrene-butadiene rubber (ESBR). As the styrene-butadiene rubber, a modified styrene-butadiene rubber in which a terminal or a main chain is modified as necessary may be used.

As the silica, wet silica such as silica made by a wet-type precipitated method or silica made by a wet-type gel-method is preferably used. A nitrogen adsorption specific surface area (BET) of the silica according to JIS K6430:2008 Appendix E (multipoint nitrogen adsorption method: BET method) is preferably, for example, 150 m$^2$/g to 250 m$^2$/g. The nitrogen adsorption specific surface area of the silica is more preferably 180 m$^2$/g to 220 m$^2$/g.

A content of the silica is, for example, preferably 5 parts by mass to 150 parts by mass, more preferably 30 parts by mass to 120 parts by mass, still more preferably 50 parts by mass to 100 parts by mass, and may be 60 parts by mass to 90 parts by mass, with respect to 100 parts by mass of the diene rubber.

The rubber composition according to the present embodiment may further contain a nitrogen-containing alkoxysilane and an alkylalkoxysilane. Accordingly, when a vulcanized rubber obtained by vulcanizing the rubber composition is deformed, a deformation following property of a rubber polymer in a vicinity of the silica can be increased. Therefore, a change in a distance between aggregates during rubber deformation can be increased, and a value of V50/V0 described later can be easily set to 1.30 or more. In addition, by improving the deformation following property, both wet grip performance and rolling resistance performance can be easily achieved. Specifically, a silica surface is hydrophobized by the alkylalkoxysilane, dispersibility of the silica is improved, a following property of the rubber to external stimulus is improved, and the wet grip performance is improved. In addition, rubbing between silica and silica is alleviated, an energy loss is reduced, and the rolling resistance performance is improved. Further, a decrease in rubber hardness can be limited due to action of a hydrogen bonding site in the nitrogen-containing alkoxysilane.

The nitrogen-containing alkoxysilane is an alkoxysilane containing nitrogen atoms in molecules. Examples of the nitrogen-containing alkoxysilane include a compound having an alkoxy group bonded to silicon atoms, and a functional group selected from the group consisting of an amino group, a ureido group, an isocyanate group, a cyano group, an azide group, and an amide group. Those containing nitrogen atoms in molecules among those generally called silane coupling agents can be used.

Specific examples of the nitrogen-containing alkoxysilane include: aminoalkoxysilanes such as 3-aminopropylalkoxysilanes (for example, 3-aminopropyltriethoxysilane and 3-aminopropyltrimethoxysilane), and 3-(2-aminoethylamino)propylalkoxysilanes (for example, 3-(2-aminoethylamino)propyltriethoxysilane, 3-(2-aminoethylamino)propyltrimethoxysilane, and 3-(2-aminoethylamino)propylmethyldimethoxysilane); ureidoalkoxysilanes such as 3-ureidopropylalkoxysilanes (for example, 3-ureidopropyltriethoxysilane, 3-ureidopropyltrimethoxysilane, 3-ureidopropylmethyldimethoxysilane, and 3-ureidopropylmethyldiethoxysilane), 2-ureidoethylalkoxysilanes (for example, 2-ureidoethyltrimethoxysilane, 2-ureidoethyltriethoxysilane, and 2-ureidoethylmethyldimethoxysilane), and ureidomethylalkoxysilanes (for example, ureidomethyltrimethoxysilane, ureidomethylmethyldimethoxysilane, ureidomethyltriethoxysilane, and ureidomethylmethyldiethoxysilane); isocyanatoalkoxysilanes such as 3-isocyanatopropylalkoxysilanes (for example, 3-isocyanatopropyltriethoxysilane and 3-isocyanatopropyltripropoxysilane), 2-isocyanatoethylalkoxysilanes (for example, 2-isocyanatoethyltrimethoxysilane and 2-isocyanatoethyltriethoxysisilane), and isocyanatomethylalkoxysilanes (for example, isocyanatomethyltrimethoxysilane and isocyanatomethyltriethoxysilane); cyanoalkoxysilanes such as 3-cyanopropylalkoxysilanes (for example, 3-cyanopropyltrimethoxysilane and 3-cyanopropyltriethoxysilane); azidoalkoxysilanes such as 3-azidopropylalkoxysilanes (for example, 3-azidopropyltriethoxysilane and 3-azidopropyltrimethoxysilane), 11-azidoundecylalkoxysilanes (for example, 11-azidoundecyltrimethoxysilane); and amide bond-containing alkoxysilanes such as triethoxysilylpropylmaleamic acid. These may be used alone or in combination of two or more thereof.

The alkylalkoxysilane may be an alkyldialkoxysilane, and preferably an alkyltrialkoxysilane. The alkylalkoxysilane preferably has an alkyl group having 3 to 20 carbon atoms, and specifically, an alkyltriethoxysilane represented by the following Formula (1) is preferably used. In the Formula (1), $R^1$ represents an alkyl group having 3 to 20 carbon atoms. The alkyl group preferably has 6 to 20 carbon atoms, and more preferably 10 to 20 carbon atoms.

A total content of the nitrogen-containing alkoxysilane and the alkylalkoxysilane in the rubber composition is preferably, for example, 3 mass % to 15 mass % with respect to the content of the silica. That is, the total amount of the nitrogen-containing alkoxysilane and the alkylalkoxysilane is preferably 3 parts by mass to 15 parts by mass with respect to 100 parts by mass of the silica. The total content of the nitrogen-containing alkoxysilane and the alkylalkoxysilane is more preferably 5 mass % to 12 mass %, and still more preferably 6 mass % to 12 mass %, with respect to the content of the silica.

Regarding a blending ratio of the nitrogen-containing alkoxysilane and the alkylalkoxysilane, a content ratio of the nitrogen-containing alkoxysilane in the total content of the nitrogen-containing alkoxysilane and the alkylalkoxysilane is, for example, preferably 10 mol % to 80 mol %, more preferably 20 mol % to 60 mol %, and still more preferably 25 mol % to 50 mol %.

In addition to the above components, various additives are generally used in the rubber composition, such as a filler other than silica, zinc oxide, stearic acid, an antioxidant, an oil, a wax, a vulcanization agent, and a vulcanization accelerator, can be blended in the rubber composition according to the present embodiment. A sulfur-containing silane coupling agent generally blended in the silica may be blended, but in one embodiment, it is preferable not to blend the sulfur-containing silane coupling agent.

As the filler, carbon black may be blended in addition to the silica. That is, as the filler, silica may be used alone, or silica and carbon black may be used in combination. Preferably, the filler contains silica as a main component, and a content of carbon black is preferably 10 parts by mass or less, and more preferably 5 parts by mass or less, with respect to 100 parts by mass of the diene rubber.

As the vulcanization agent, sulfur is preferably used. A content of the vulcanization agent is not particularly limited, and is preferably 0.1 parts by mass to 10 parts by mass, more preferably 0.5 parts by mass to 5 parts by mass, and may be 1 part by mass to 3 parts by mass, with respect to 100 parts by mass of the diene rubber.

Examples of the vulcanization accelerator include various vulcanization accelerators such as sulfenamide-based, thiuram-based, thiazole-based, and guanidine-based vulcanization accelerators, which may be used alone or in combination of two or more kinds thereof. A content of the vulcanization accelerator is not particularly limited, and is preferably 0.1 parts by mass to 10 parts by mass, more preferably 0.5 parts by mass to 5 parts by mass, and may be 1 part by mass to 4 parts by mass, with respect to 100 parts by mass of the diene rubber.

The rubber composition according to the present embodiment can be produced by kneading according to a common method by using a mixer such as a Banbury mixer, a kneader, or a roll that is generally used. That is, for example, in a first mixing stage (non-productive kneading step), the silica and an additive other than a vulcanization agent and a vulcanization accelerator are added to the diene rubber. Next, a vulcanization agent and a vulcanization accelerator are added and mixed in the obtained mixture in a final mixing stage (productive kneading step). Accordingly, an unvulcanized rubber composition can be prepared.

In the rubber composition according to the present embodiment, the change rate V50/V0 of the distance between aggregates when the vulcanized rubber obtained by vulcanizing the rubber composition is deformed at an elongation rate of 0% to 50% is 1.30 or more. The larger the change rate V50/V0, the higher the deformation following property of the rubber polymer in the vicinity of the silica when the vulcanized rubber is deformed, and the conflicting performance regarding the wet grip performance and the rolling resistance performance can be improved. V50/V0 is preferably 1.32 or more, and more preferably 1.34 or more. An upper limit of V50/V0 is not particularly limited, and is preferably 2.0 or less, and more preferably 1.50 or less.

Here, V50 is an inertia radius (nm) of a silica aggregate obtained by a small-angle X-ray scattering (SAXS) measurement in a state where the vulcanized rubber is elongated by 50% in a direction perpendicular to an orientation direction of the silica. V0 is an inertia radius (nm) of the silica aggregate obtained by the small-angle X-ray scattering measurement in a state where the vulcanized rubber is not elongated. The change rate of the distance between aggregates is a value (quotient) obtained by dividing the inertia radius V50 at 50% elongation by the inertia radius V0 at 0% elongation.

The orientation direction of the silica can be confirmed by the SAXS measurement on the unvulcanized rubber in a non-elongated state. For a vulcanized rubber in which the silica does not have an orientation in the non-elongated state (that is, a vulcanized rubber not exhibiting anisotropy in a two-dimensional scattering image), the SAXS measurement is performed in a state where the vulcanized rubber is elongated by 50% in any direction. That is, V50 is an inertia radius of the silica aggregate obtained by the SAXS measurement in a state where a vulcanized rubber in which the silica has an orientation (that is, anisotropy) in the non-elongated state is elongated by 50% in the direction perpendicular to the orientation direction, and is an inertia radius of the silica aggregate obtained by the SAXS measurement in a state where the vulcanized rubber having no anisotropy in the non-elongated state is elongated by 50% in any direction.

Values of V0 and V50 may be, for example, 1.0 nm to 100 nm, 5.0 nm to 50 nm, or 10 nm to 40 nm.

V0 and V50 are values obtained by measuring the vulcanized rubber obtained by vulcanizing the rubber composition. Therefore, in the present embodiment, V50/V0 in the vulcanized rubber may be 1.30 or more. That is, a vulcanized rubber according to an embodiment is obtained by vulcanizing a rubber composition containing a diene rubber and silica, and is a vulcanized rubber having V50/V0 of 1.30 or more. The vulcanized rubber may constitute a part of a rubber product such as a tire, or may constitute the entire rubber product.

The inertia radius of the silica aggregate is obtained by the small-angle X-ray scattering measurement by irradiating the vulcanized rubber with X-rays. The small-angle X-ray (SAXS) measurement is a method of measuring scattered X-rays having a scattering angle of several degrees or less (normally 10° or less). When the vulcanized rubber is irradiated with the X-rays, the X-rays are scattered by reflecting an electron density of a substance constituting the vulcanized rubber. The inertia radius of the silica aggregate is obtained based on a scattering profile thus obtained.

Specifically, the inertia radius is obtained by a method described in Japanese Patent No. 6578200 (the entire contents are incorporated herein by reference). That is, by performing the small-angle X-ray scattering measurement by irradiating the vulcanized rubber with high luminance X-rays of $10^{10}$ (photons/s/mrad$^2$/mm$^2$/0.1% bw) or more, a two-dimensional scattering image showing a magnitude of a scattering intensity as shown in FIG. 1 is obtained. In FIG. 1, the closer to white, the larger the scattering intensity, the closer to black, the smaller the scattering intensity, and a contour line is indicated by a white line (dotted line). A black portion of a scattering center and a black line extending downward from the black portion are shadowed portions by a beam stopper. The two-dimensional scattering image has constrictions on both left and right sides of the scattering center, and a left-right direction in which the constrictions are present is the orientation direction of the silica. The scattering intensity of the two-dimensional scattering image is averaged (circularly averaged) in a predetermined angle range β=30° (a range of 15° on both sides about an elongation direction) in a direction perpendicular to the orientation direction of the silica (sector), thereby obtaining a one-dimensional scattering profile. The scattering profile is a curve showing the magnitude of a scattering intensity I(q) with respect to a scattering vector q ($=(4\pi/\lambda) \sin(\theta/2)$, here, θ is a scattering angle, and λ is a wavelength of the X-ray). The inertia radius of the silica aggregate is obtained by fitting to the obtained scattering profile. When obtaining V0 for the vulcanized rubber having no anisotropy in the non-elongated state, the above circular averaging is performed at the angle range β=30° about an elongation direction in the case of measuring V50.

As disclosed in Japanese Patent No. 6578200, the inertia radius calculated based on the angle range β of the sector increases as the elongation rate increases, and influence of a structural factor (spatial structure information of a filler) is large. Therefore, by using the inertia radius calculated based on the angle range β of the sector, a change in the inertia radius due to a difference in the elongation rate can be seen as an index of a deformation following property of a rubber polymer in a vicinity of the filler. Therefore, in the present embodiment, the inertia radius V0 measured in a non-elongated state (that is, at an elongation rate of 0%) and the inertia radius V50 measured at an elongation rate of 50% are obtained, and a ratio thereof is obtained and the ratio V50/V0 is determined to be defined as the change rate of the distance between aggregates. Details of measurement conditions in the small-angle X-ray scattering measurement and a calculation method of the inertia radius are as described in Examples described later.

The rubber composition according to the present embodiment can be suitably used as a rubber composition for a tire. Examples of the tire include pneumatic tires having various uses and sizes, such as a tire for a passenger car and a heavy duty tire for a truck or a bus.

A tire according to an embodiment is a tire produced by using the above rubber composition. That is, the tire contains a vulcanized rubber formed of the above rubber composition. Examples of an application site of the tire include a tread rubber and a sidewall rubber, and preferably a tread rubber.

The tread rubber of the tire has a two-layer structure including a cap rubber and a base rubber, or has a single-layer structure in which the cap rubber and the base rubber are integrated. In the single-layer structure, the tread rubber may be formed of the above rubber composition. In the two-layer structure, the cap rubber on an outer side in contact with a road surface may be formed of the above rubber composition, the base rubber disposed on an inner side of the cap rubber may be formed of the above rubber composition, or both the cap rubber and the base rubber may be formed of the above rubber composition.

A method of manufacturing the tire is not particularly limited. For example, the above rubber composition is molded into a predetermined shape by extrusion according to a common method, and is combined with other parts to produce an unvulcanized tire (green tire). For example, the tread rubber is produced by using the above rubber composition, and is combined with other tire parts to produce an unvulcanized tire. Thereafter, the tire can be manufactured by vulcanization molding at 140° C. to 180° C., for example.

EXAMPLES

Hereinafter, Examples will be illustrated, but the invention is not limited to these Examples.

A rubber composition was prepared according to blending (part by mass) shown in Tables 1 to 3 below. In detail, a diene rubber was masticated for 30 seconds by using a labo mixer (300 cc) manufactured by Daihan Co., Ltd., and then components other than sulfur and a vulcanization accelerator were charged into the labo mixer and kneaded for 240 seconds, and then discharged. The discharged kneaded material was charged into the labo mixer again, kneaded for 180 seconds, and then discharged. Next, the discharged kneaded material was charged into the labo mixer together with sulfur and a vulcanization accelerator, kneaded for 60 seconds, and discharged. The obtained unvulcanized rubber composition was subjected to sheeting by using two rolls so as to have a thickness of 1.0 mm, and then subjected to vulcanization pressing at 160° C. for 20 minutes to obtain a vulcanized rubber sample having a thickness of 1.0 mm.

Details of each component in Tables 1 to 3 are as follows.
S-SBR: "HPR350" manufactured by JSR Corporation, amino group terminal-modified solution-polymerized SBR
Silica: "Nipsil AQ" manufactured by Tosoh Corporation (nitrogen adsorption specific surface area: 205 m²/g)
Sulfur-containing silane coupling agent: "Si75" manufactured by EVONIK Industries
Alkylalkoxysilane: octadecyltriethoxysilane manufactured by Tokyo Chemical Industry Co., Ltd.
Aminoalkoxysilane 1: 3-aminopropyltriethoxysilane manufactured by Tokyo Chemical Industry Co., Ltd.
Aminoalkoxysilane 2: 3-(2-aminoethylamino)propyltrimethoxysilane manufactured by Tokyo Chemical Industry Co., Ltd.
Ureidoalkoxysilane: "1-[3-(triethoxysilyl)propyl]urea (40% to 52% in methanol)" and 3-ureidopropyltriethoxysilane manufactured by Tokyo Chemical Industry Co., Ltd.
Isocyanatoalkoxysilane: 3-isocyanatopropyltriethoxysilane manufactured by Tokyo Chemical Industry Co., Ltd.
Zinc oxide: "Zinc Oxide Grade 3" manufactured by Mitsui Mining & Smelting Co., Ltd.
Stearic acid: "LUNAC S-20" manufactured by Kao Corporation
Sulfur: "Powdered sulfur" manufactured by Tsurumi Chemical Industry Co., Ltd.
Vulcanization accelerator 1: "SOXINOL CZ" manufactured by Sumitomo Chemical Co., Ltd.
Vulcanization accelerator 2: "NOCCELER D" manufactured by Ouchi Shinko Chemical Industrial Co., Ltd.

The expression "molar ratio (%) of nitrogen-containing alkoxysilane" in Tables 1 to 3 is the content ratio (mol %) of the nitrogen-containing alkoxysilane in the total content of the nitrogen-containing alkoxysilane and the alkylalkoxysilane. A blending amount of the ureidoalkoxysilane in Tables 1 and 2 is an amount containing methanol in a product.

For the obtained vulcanized rubber sample, a change rate V50/V0 of a distance between aggregates was calculated. A measurement method is as follows.

Based on the method described in Japanese Patent No. 6578200, a SAXS measurement was performed in states where the elongation rate was 0% and 50% in consideration of an orientation direction of silica. Specifically, the sample was first fixed in a state where the elongation rate was 0% by using a both-end tensioning device that can be fixed at any strain, and the sample was subjected to the SAXS measurement by being irradiated with X-rays in this state. Next, based on the orientation direction of the silica confirmed by this measurement, the sample was elongated by 50% in a direction perpendicular to the orientation direction and fixed, and the SAXS measurement in which the sample was irradiated with X-rays in this state was performed.

The SAXS measurement was performed under the following measurement conditions by using a beam line BL08B2 of SPring-8 from Japan Synchrotron Radiation Research Institute as a synchrotron that emits high luminance X-rays.
Wavelength of incident X-ray: 0.15 nm
Camera length: 6 m
Exposure time: 1 second
q range: $0.015 \text{ nm}^{-1}$ to $0.8 \text{ nm}^{-1}$
Detector: PILATUS Based on a two-dimensional scattering image obtained by the small-angle X-ray scattering measurement, a scattering intensity was circularly averaged in an angle range $\beta=30°$ (see FIG. 1) in a direction (meridian direction) perpendicular to the orientation direction to obtain a one-dimensional scattering profile. An inertia radius of a silica aggregate was obtained by fitting to the obtained scattering profile, an inertia radius obtained at the elongation rate of 0% was defined as V0, an inertia radius obtained at the elongation rate of 50% was defined as V50, and the change rate V50/V0 of the distance between aggregates was calculated. When no constriction was present in the two-dimensional scattering image in a state where the elongation rate was 0% (that is, when there was no anisotropy), the circular averaging was performed at the angle range β=30° in any direction to obtain V0, and then 50% elongation was performed in this direction to obtain V50.

The fitting was performed by a least squares method using a fitting function in the following equation (equation source: G. Beaucage, J. Appl. Cryst. 28, 717-728 (1995)).

$$I(q) = \sum_{i=1}^{n}\left(G_i\exp\left(-\frac{q^2R_{gi}^2}{3}\right) + B_i\exp\left(-\frac{q^2R_{g(i+1)}^2}{3}\right) \times \{[\text{erf}(qkR_{gi}/\sqrt{6})]^3/q\}^{P_i}\right)$$

In the equation, I(q) is the scattering intensity, $G_i$, $B_i$, k, $P_i$ are regression coefficients, and q is a scattering vector and an independent variable. $R_{gi}$ represents an aggregate radius (inertia radius of silica aggregate).

For the unvulcanized rubber composition obtained above, wet grip performance (wet) and rolling resistance performance (RR) were measured by using the sample vulcanized at 160° C. for 20 minutes, a balance (wet/RR index) therebetween was evaluated, and hardness was measured. A measurement and evaluation method is as follows.

[Wet Grip Performance]

A loss coefficient tan δ was measured at a frequency of 10 Hz, an electrostatic strain of 10%, a dynamic strain of 1%, and a temperature of 0° C. by using a viscoelasticity tester manufactured by Ueshima Seisakusho Co., Ltd. Values are indicated as indexes using values in Comparative Example 1 in Tables 1 and 2 and a value in Comparative Example 6 in Table 3 each set as an index of 100. The larger the index, the larger the tan δ, and the better the wet grip performance when the tire is produced.

[Rolling Resistance Performance]

A loss coefficient tan δ was measured at a frequency of 10 Hz, an electrostatic strain of 10%, a dynamic strain of 1%, and a temperature of 60° C. by using a viscoelasticity tester manufactured by Ueshima Seisakusho Co., Ltd. Values are indicated as indexes using values in Comparative Example 1 in Tables 1 and 2 and a value in Comparative Example 6 in Table 3 each set as an index of 100. The smaller the index, the smaller the tan δ, and the better the rolling resistance performance when the tire is produced.

[Wet/RR Index]

A value of tan δ at 0° C., i.e., the wet grip performance (wet) measured as described above, was divided by a value of tan δ at 60° C., i.e., the rolling resistance performance (RR), and an index (wet/RR index) of the obtained value was regarded as balance performance. Values are indicated as indexes using values in Comparative Example 1 in Tables 1 and 2 and a value in Comparative Example 6 in Table 3 each set as an index of 100. The larger the index, the greater an effect of improving conflicting performance regarding the wet grip performance and the rolling resistance performance, and the better the performances.

[Hardness]

The hardness was measured at 23° C. by using a type A durometer in accordance with JIS K6253-3:2012, and values are indicated as indexes using values in Comparative Example 1 in Tables 1 and 2 and a value in Comparative Example 6 in Table 3 each set as an index of 100. The larger the index, the higher the hardness, and the better the steering stability when the tire is produced.

TABLE 1

|  | Comparative Example 1 | Comparative Example 2 | Comparative Example 3 | Comparative Example 4 | Comparative Example 5 |
|---|---|---|---|---|---|
| Blending (part by mass) | | | | | |
| S-SBR | 100 | 100 | 100 | 100 | 100 |
| Silica | 75 | 75 | 75 | 75 | 75 |
| Zinc oxide | 2 | 2 | 2 | 2 | 2 |
| Stearic acid | 2 | 2 | 2 | 2 | 2 |
| Sulfur-containing silane coupling agent | 6 | — | — | — | — |
| Alkylalkoxysilane | — | — | — | — | — |
| Aminoalkoxysilane 1 | — | 2.7 | — | — | — |
| Aminoalkoxysilane 2 | — | — | 2.7 | — | — |
| Ureidoalkoxysilane | — | — | — | 6.3 | — |
| Isocyanatoalkoxysilane | — | — | — | — | 3 |
| Sulfur | 1.8 | 1.8 | 1.8 | 1.8 | 1.8 |
| Vulcanization accelerator 1 | 1.3 | 1.3 | 1.3 | 1.3 | 1.3 |
| Vulcanization accelerator 2 | 1.8 | 1.8 | 1.8 | 1.8 | 1.8 |
| Molar ratio (%) of nitrogen-containing alkoxysilane | 0 | 100 | 100 | 100 | 100 |
| V0 (nm) | 20.6 | 30.5 | 29.8 | 26.4 | 28.1 |
| V50 (nm) | 26.4 | 32.5 | 31.4 | 31.3 | 30.8 |
| V50/V0 | 1.28 | 1.06 | 1.06 | 1.19 | 1.10 |
| Evaluation (index) | | | | | |
| Wet grip performance | 100 | 85 | 89 | 79 | 78 |
| Rolling resistance performance | 100 | 92 | 101 | 79 | 88 |
| Wet/RR index | 100 | 92 | 88 | 99 | 89 |
| Hardness | 100 | 118 | 118 | 120 | 118 |

TABLE 2

|  | Example 1 | Example 2 | Example 3 | Example 4 | Example 5 | Example 6 | Example 7 | Example 8 |
|---|---|---|---|---|---|---|---|---|
| Blending (part by mass) | | | | | | | | |
| S-SBR | 100 | 100 | 100 | 100 | 100 | 100 | 100 | 100 |
| Silica | 75 | 75 | 75 | 75 | 75 | 75 | 75 | 75 |
| Zinc oxide | 2 | 2 | 2 | 2 | 2 | 2 | 2 | 2 |
| Stearic acid | 2 | 2 | 2 | 2 | 2 | 2 | 2 | 2 |
| Sulfur-containing silane coupling agent | — | — | — | — | — | — | — | — |
| Alkylalkoxysilane | 4.5 | 3.8 | 2.5 | 1.0 | 3.8 | 2.5 | 3.8 | 3.8 |
| Aminoalkoxysilane 1 | 0.3 | 0.7 | 1.3 | 2.2 | — | — | — | — |
| Aminoalkoxysilane 2 | — | — | — | — | 0.7 | 1.4 | — | — |
| Ureidoalkoxysilane | — | — | — | — | — | — | 1.6 | — |
| Isocyanatoalkoxysilane | — | — | — | — | — | — | — | 0.7 |
| Sulfur | 1.8 | 1.8 | 1.8 | 1.8 | 1.8 | 1.8 | 1.8 | 1.8 |
| Vulcanization accelerator 1 | 1.3 | 1.3 | 1.3 | 1.3 | 1.3 | 1.3 | 1.3 | 1.3 |
| Vulcanization accelerator 2 | 1.8 | 1.8 | 1.8 | 1.8 | 1.8 | 1.8 | 1.8 | 1.8 |
| Molar ratio (%) of nitrogen-containing alkoxysilane | 10 | 25 | 50 | 80 | 25 | 50 | 25 | 25 |
| V0 (nm) | 21.4 | 22.6 | 23.6 | 23.8 | 21.7 | 23.5 | 23.6 | 23.8 |
| V50 (nm) | 31.0 | 31.3 | 31.2 | 30.9 | 30.8 | 31.7 | 30.6 | 31.0 |
| V50/V0 | 1.45 | 1.38 | 1.32 | 1.30 | 1.42 | 1.31 | 1.30 | 1.30 |
| Evaluation (index) | | | | | | | | |
| Wet grip performance | 125 | 124 | 112 | 102 | 124 | 108 | 104 | 103 |
| Rolling resistance performance | 71 | 73 | 80 | 93 | 79 | 85 | 77 | 78 |
| Wet/RR index | 175 | 171 | 141 | 110 | 157 | 128 | 136 | 132 |
| Hardness | 100 | 102 | 107 | 115 | 100 | 108 | 105 | 105 |

TABLE 3

|  | Comparative Example 6 | Comparative Example 7 | Example 9 |
|---|---|---|---|
| Blending (part by mass) | | | |
| S-SBR | 100 | 100 | 100 |
| Silica | 50 | 50 | 50 |
| Zinc oxide | 2 | 2 | 2 |
| Stearic acid | 2 | 2 | 2 |
| Sulfur-containing silane coupling agent | 4 | — | — |
| Alkylalkoxysilane | — | — | 1.7 |
| Aminoalkoxysilane 1 | — | 1.8 | 0.9 |
| Sulfur | 1.8 | 1.8 | 1.8 |
| Vulcanization accelerator 1 | 1.3 | 1.3 | 1.3 |
| Vulcanization accelerator 2 | 1.8 | 1.8 | 1.8 |
| Molar ratio (%) of nitrogen-containing alkoxysilane | 0 | 100 | 50 |
| V0 (nm) | 28.5 | 30.3 | 24.7 |
| V50 (nm) | 36.5 | 35.9 | 35.2 |
| V50/V0 | 1.28 | 1.19 | 1.42 |
| Evaluation (index) | | | |
| Wet grip performance | 100 | 99 | 107 |
| Rolling resistance performance | 100 | 102 | 94 |
| Wet/RR index | 100 | 97 | 113 |
| Hardness | 100 | 100 | 100 |

Results are as shown in Tables 1 to 3. As shown in Table 1, in Comparative Examples 2 to 5, V50/V0 is less than 1.30, and the deformation following property of a rubber polymer in a vicinity of the silica when the vulcanized rubber is deformed is poor, and thus as compared with Comparative Example 1 in which a sulfur-containing silane coupling agent is blended, the wet/RR index is the same or less, and the conflicting performance regarding the wet grip performance and the rolling resistance performance is not improved. On the other hand, as shown in Table 2, in Examples 1 to 8, V50/V0 is 1.30 or more, and the deformation following property of the rubber polymer in the vicinity of the silica when the vulcanized rubber is deformed is excellent, and thus as compared with Comparative Example 1, the wet/RR index is large, the conflicting performance regarding the wet grip performance and the rolling resistance performance is improved, and both the performances can be achieved at a high level. In addition, by using the nitrogen-containing alkoxysilane and the alkylalkoxysilane in combination, a decrease in hardness can be limited as compared with Comparative Example 1 using the sulfur-containing silane coupling agent. Therefore, in Examples 1 to 8, the effect of achieving both the wet grip performance and the rolling resistance performance can be increased while maintaining the hardness.

In an experimental example shown in Table 3, a blending amount of the silica is 50 parts by mass with respect to 100 parts by mass of the diene rubber, and is reduced as compared with experimental examples shown in Tables 1 and 2. In this case, in Example 9 in which V50/V0 is also 1.30 or more, the wet/RR index is large as compared with Comparative Example 6 that serves as a reference, and both the wet grip performance and the rolling resistance performance can be achieved at a high level. In addition, by using the nitrogen-containing alkoxysilane and the alkylalkoxysilane in combination, the hardness is maintained as compared with Comparative Example 6.

In various numerical ranges described in the specification, upper limit values and lower limit values thereof can be freely combined, and all combinations thereof are described in the present specification as preferable numerical ranges. In addition, the description of the numerical range of "X to Y" means X or more and Y or less.

What is claimed is:
1. A rubber composition comprising:
a diene rubber; and
silica, wherein
a change rate of a distance between aggregates represented by V50/V0 calculated by an inertia radius V50 of a silica aggregate and an inertia radius V0 of the silica aggregate is 1.30 or more, the inertia radius V50 being obtained by performing a small-angle X-ray scattering measurement in a state where a vulcanized rubber obtained by vulcanizing the rubber composition is elongated by 50%, and the inertia radius V0 being obtained by performing a small-angle X-ray scattering measurement in a state where the vulcanized rubber is not elongated.

2. The rubber composition according to claim 1, further comprising:
a nitrogen-containing alkoxysilane; and
an alkylalkoxysilane.

3. The rubber composition according to claim 2, wherein a content of the silica is 5 parts by mass to 150 parts by mass with respect to 100 parts by mass of the diene rubber, a total content of the nitrogen-containing alkoxysilane and the alkylalkoxysilane is 3 mass % to 15 mass % with respect to the content of the silica, and a content ratio of the nitrogen-containing alkoxysilane in the total content of the nitrogen-containing alkoxysilane and the alkylalkoxysilane is 10 mol % to 80 mol %.

4. The rubber composition according to claim 2, wherein the nitrogen-containing alkoxysilane has at least one functional group selected from the group consisting of an amino group, a ureido group, an isocyanate group, a cyano group, an azide group, and an amide group.

5. The rubber composition according to claim 2, wherein the alkylalkoxysilane is an alkyltriethoxysilane represented by the following Formula (1)

in the Formula (1), $R^1$ represents an alkyl group having 3 to 20 carbon atoms.

6. The rubber composition according to claim 1, wherein the silica has an orientation in a state where the vulcanized rubber is not elongated, and the inertia radius V50 is a value obtained by performing the small-angle X-ray scattering measurement in a state where the vulcanized rubber is elongated by 50% in a direction perpendicular to an orientation direction of the silica.

7. A pneumatic tire, which is produced using the rubber composition according to claim 1.

8. A pneumatic tire, which is produced using the rubber composition according to claim 2.

9. A pneumatic tire, which is produced using the rubber composition according to claim 3.

10. A pneumatic tire, which is produced using the rubber composition according to claim 4.

11. A pneumatic tire, which is produced using the rubber composition according to claim 5.

12. A pneumatic tire, which is produced using the rubber composition according to claim 6.

13. A vulcanized rubber obtained by vulcanizing a rubber composition containing a diene rubber and silica, wherein
a change rate of a distance between aggregates represented by V50/V0 calculated by an inertia radius V50 of a silica aggregate and an inertia radius V0 of the silica aggregate is 1.30 or more, the inertia radius V50 being obtained by performing a small-angle X-ray scattering measurement in a state where the vulcanized rubber is elongated by 50%, and the inertia radius V0 being obtained by performing a small-angle X-ray scattering measurement in a state where the vulcanized rubber is not elongated.

14. The vulcanized rubber according to claim 13, wherein the rubber composition further contains a nitrogen-containing alkoxysilane and an alkylalkoxysilane.

15. The vulcanized rubber according to claim 14, wherein a content of the silica is 5 parts by mass to 150 parts by mass with respect to 100 parts by mass of the diene rubber, a total content of the nitrogen-containing alkoxysilane and the alkylalkoxysilane is 3 mass % to 15 mass % with respect to the content of the silica, and a content ratio of the nitrogen-containing alkoxysilane in the total content of the nitrogen-containing alkoxysilane and the alkylalkoxysilane is 10 mol % to 80 mol %.

16. The vulcanized rubber according to claim 14, wherein the nitrogen-containing alkoxysilane has at least one functional group selected from the group consisting of an amino group, a ureido group, an isocyanate group, a cyano group, an azide group, and an amide group.

17. The vulcanized rubber according to claim 14, wherein the alkylalkoxysilane is an alkyltriethoxysilane represented by the following Formula (1)

in the Formula (1), $R^1$ represents an alkyl group having 3 to 20 carbon atoms.

18. The vulcanized rubber according to claim 13, wherein the silica has an orientation in a state where the vulcanized rubber is not elongated, and the inertia radius V50 is a value obtained by performing the small-angle X-ray scattering measurement in a state where the vulcanized rubber is elongated by 50% in a direction perpendicular to an orientation direction of the silica.

* * * * *